Figure 5:
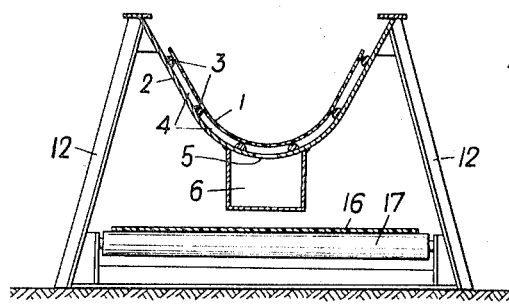

United States Patent

[11] 3,627,111

| [72] | Inventor | Bruno Hillinger |
| | | Vienna, Austria |
| [21] | Appl. No. | 875,987 |
| [22] | Filed | Nov. 12, 1969 |
| [45] | Patented | Dec. 14, 1971 |
| [73] | Assignee | Waagner-Biro Aktiengesellschaft |
| | | Vienna, Austria |

[54] TRANSPORT DEVICE
14 Claims, 17 Drawing Figs.

[52] U.S. Cl. .................................................... 198/184,
198/191, 198/204
[51] Int. Cl. ........................................................ B65g 15/08
[50] Field of Search ............................................ 198/184,
191, 137, 201, 202, 203, 204

[56] References Cited
UNITED STATES PATENTS

| 566,637 | 8/1896 | Wallis | 198/203 X |
| 2,584,288 | 2/1952 | Przybylski | 198/191 |
| 3,147,852 | 9/1964 | Hanson, Jr. | 198/204 |

FOREIGN PATENTS

| 964,482 | 5/1957 | Germany | 198/184 |
| 1,166,086 | 3/1964 | Germany | 198/184 |

Primary Examiner—Richard E. Aegerter
Assistant Examiner—Alfred N. Goodman
Attorney—Steinberg and Blake ABSTRACT: A transport device for transporting bulk goods. The device includes an endless belt having an upper load-carrying run. This upper run of the belt is situated within an elongated trough. Within the trough the upper run of the belt is supported longitudinally of the trough on rails. A source of fluid under pressure, such as a source of compressed air, communicates with the interior of the trough to supply an air cushion beneath the belt with the compressed air which forms the cushion being limited laterally by the rails. The pressure of the gas of the air cushion is greater than atmospheric pressure so that the rails themselves are substantially unloaded, enabling the belt to travel along the rails with very little friction.

Patented Dec. 14, 1971

3,627,111

3 Sheets-Sheet 2

INVENTOR
BRUNO HILLINGER

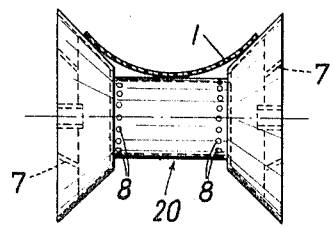
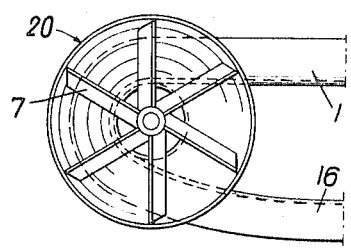
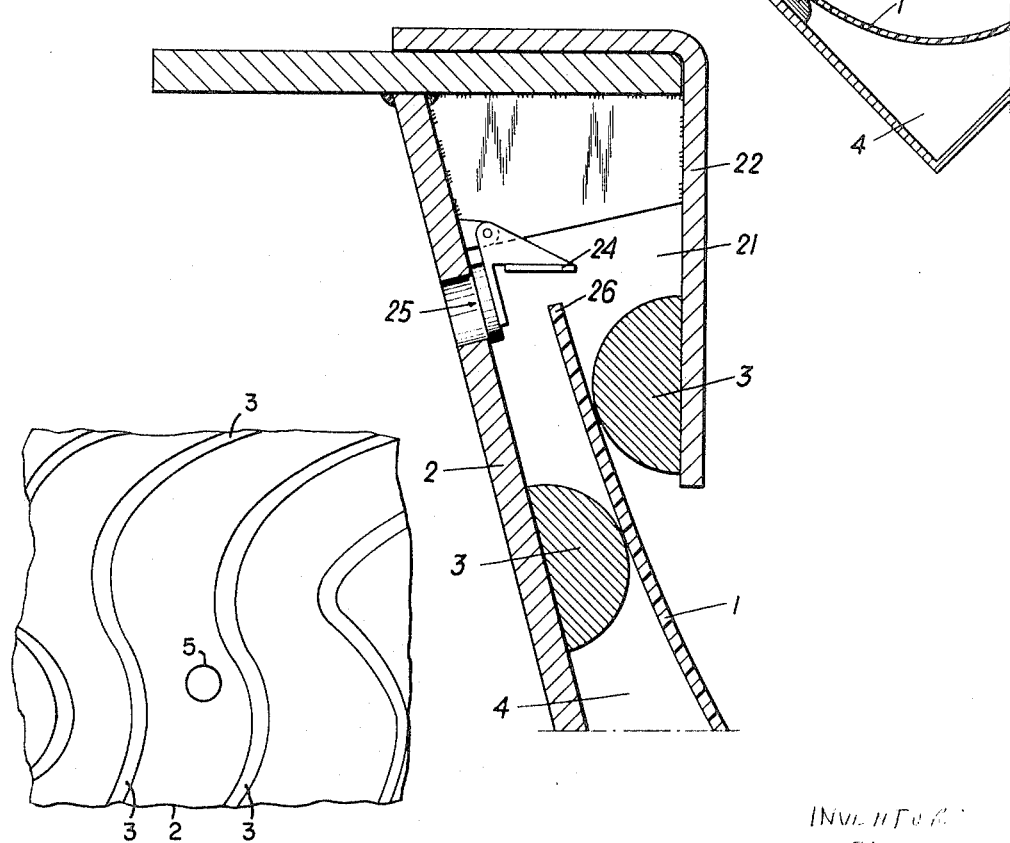

TRANSPORT DEVICE

The invention refers to a transport device, especially for transporting loose material. There are known transport devices especially conveyor belts having endless belts which are running on rollers.

The known conveyor belts are disadvantageous because of a low transport speed which is about 3 m./sec. at the most. Further the volumetric efficiency of known conveyor belts is small even if it is a trough-shaped belt having three supporting rollers. Large belt widths are required and these in turn cause difficulties in stabilizing the belt which easily drifts laterally due to the large widths. The conveyor belt further is stressed by bending when running over the supporting rollers. The result is an alternative stress of the belt, which is unfavorable for its durability. Due to the large number of supporting rollers, which of course need to be serviced, there is required a large spare-parts depot as well as a large starting energy when setting the transport device into operation. These disadvantages have the unfavorable effect of impairing the availability of the device and of increasing the costs.

The invention removes the deficiencies of the known devices and is characterized in that the portion of an endless belt carrying the load is arranged in a trough and is supported by rails in the longitudinal direction of the trough, gas cushions being arranged especially between the belt and the trough, with the cushions being laterally limited by rails, and the has having a higher then the atmospheric pressure so that the guide rails between the trough and the belt are almost without load. According to a further characteristic of the invention the rails are meander-shaped and are formed of a plastic material.

According to another feature of the invention, guide rails are arranged at the edges of the loaded run of the conveyor belt which moves on the air cushion, these rails being situated at the lower and upper faces of the belt for sealing purposes. The guide rails are arranged over the entire length of the loaded run of the conveyor belt on its carrying trough and on edge covering profiles opposite to each other or nearly opposite to each other. Together with the covering profiles the carrying trough forms at each belt side edge a chamber which is open on one side, the edge of the conveyor belt reaching into the open side of said chamber. Within the chamber there are provided stops hindering the lateral drifting and lifting of the conveyor belt.

Compared with the known devices the transport device according to the invention has the following advantages. The conveyor belt hardly is alternatingly stressed because it is uniformly supported on its loaded run, partially by rails and partially by gas cushions arranged in accordance with the invention. The friction between the rails and the belt is nearly nil because the pressure on the rails can be kept insignificantly small. The carrying construction of the belt serves also as the supporting structure and encloses the conveyor belt like a closed profile so that the transported materials are not exposed to the wind. In some cases the belt can be covered by flat covers. The belt speed can be increased to 10 m./sec. and more because no turning parts, as for instance supporting rollers, are provided. Due to the free selection of the trough profile a volumetric efficiency can be reached which corresponds to a semicircle profile. By the high profile any fouling is avoided. There is the possibility of passing larger curves without having to transfer the load from one belt to another. The starting energy of the transport device is small because the number of the turnable parts which must be rotated is small.

In the FIGS. 1 to 16 the invention is shown by way of example and schematically. The FIGS. 1 and 2 show a part of the transport device in vertical and horizontal projection. The FIGS. 3 and 4 show different cross sections at an enlarged scale. FIG. 3A is a fragmentary developed plan view of a trough of the invention as it appears when looking downwardly on the trough with the upper run of the conveyor belt removed. The FIGS. 5 and 6, 7 and 8, 9 and 10, 11 and 12, are various embodiments of the device according to the invention. In the FIGS. 13 and 14 the guide rollers according to the invention are shown in a front elevation and in a lateral elevation. FIG. 15 shows the lateral sealing of the conveyor belt and FIG. 16 is a detail thereof.

In the FIGS. 1 and 2 there is shown a transport device according to the invention arranged at a certain level above the ground. When looked at from outside a bridgelike steel structure 11 is to be seen which extends approximately along a straight line and which has supports 12 at certain intervals. Advantageously a compressor 13 is arranged close to a support, said compressor pressing pressure air into the line system 14 of the transport device. The line system 14 extends over the entire length of the transport device. At certain intervals branch lines 15 are provided with air vessels 9 for replacing the escaping air. The conveyor belt 1, especially its loaded run, is arranged within a trough 2 and therefore generally cannot be seen from out side. The returning empty run 16 generally returns under the trough 2 and is supported by rollers 17 inside of the supports 12. In some cases further intermediate bearings can be provided also between the individual supports 12. In most of the cases a removable catwalk 18 is provided above the conveyor belt 1 which covers the belt. The passage 18 has removable covering plates 19 (FIG. 2) which can be walked on and cover the conveyor belt.

In FIG. 3 a cross section through the device according to the invention is represented at an enlarged scale. The conveyor belt 1 is arranged on rails 3 which are run approximately in the direction of the trough. For protecting the conveyor belt the rails 3 are approximately meander-shaped as indicated in FIG. 3A. Beneath the belt 1 and the rails 3 there is provided a trough 2 which is closed by covering plates 19 of the catwalk 18. Beneath the trough 2 there are arranged distributing channels 6 which are connected with the inside of the trough 2 through openings 5. The line system 14 of the pressure air conduit discharges into the distributing channels 6; said conduit supplies the required medium for the gas cushions 4 between the trough 2 and the conveyor belt 1. The gaseous medium escaping through the channels 4 is replaced continuously. Air vessels 9 are provided for replacing eventual maximum losses of the gaseous medium due to an unequal load of the belt 1. Pressure air is supplied in such a manner that a small excess pressure of air relative to the free atmosphere of 100 mm. of water (water column) is maintained in the channels 4; in this way the reaction or pressure of the transport belt 1 on the rails 3 is reduced to nearly nil. This results in a small friction which in turn affects the economical side of said transport device in a favorable manner.

In FIG. 4 there is shown a cross section through the transport device close to a support. The support 12 is not only to serve for supporting the transport device but also to support the unloaded returning empty run 16 of the transport belt. Substantially the same reference numerals are used as in the preceding figures.

Figure 6:
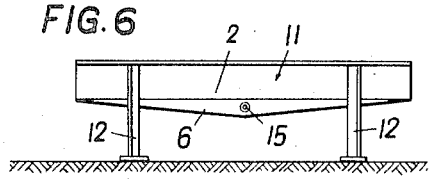

In the FIGS. 5 and 6 a transport device is represented schematically in a vertical and a side elevation; the distributing channels 6 of this device are supplied in the middle between two supports and its channels diminish or taper towards the ends of the transport trough. For an entire transport device having one belt and two guide rollers several structures of this kind can be joined together, of course.

Figure 7:
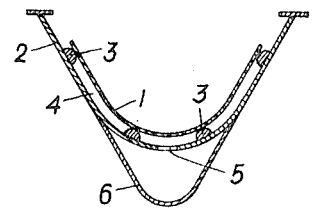
Figure 8:
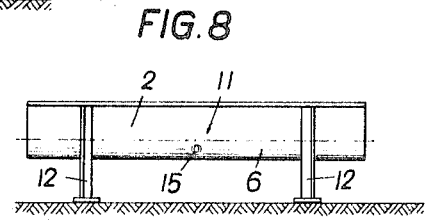

In the FIGS. 7 and 8 a transport device according to the invention is represented in a vertical and a side elevation; similar to the preceding figures the distributing channel 6 is supplied once or several times. However, in this case the channel 6 itself has a constant cross section.

Figure 9:
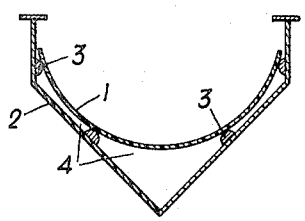
Figure 10:
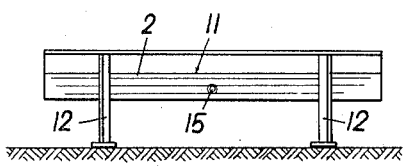

The FIGS. 9 and 10 show a transport device in a vertical and a side elevation wherein the distributing channel 6 can be left off by forming the trough 2 correspondingly. In this case too pressure medium can be supplied once or several times between two supports.

Figure 11:
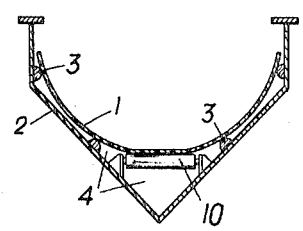
Figure 12:
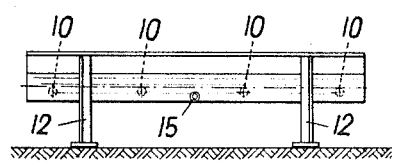
Figure 5:
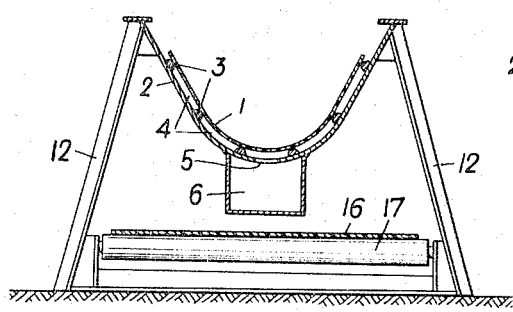
Figure 7:
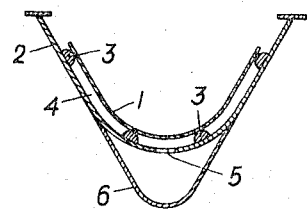
Figure 6:
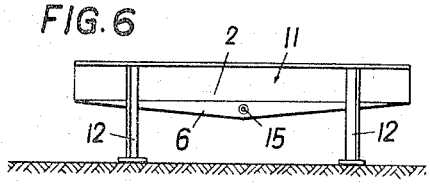
Figure 8:
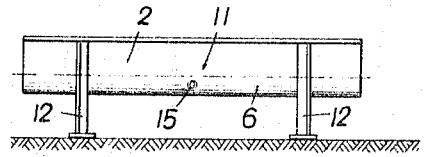
Figure 9:
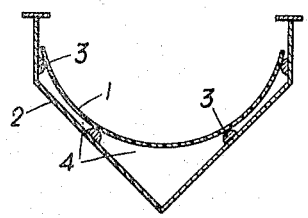
Figure 11:
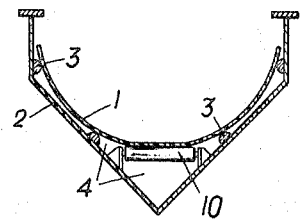
Figure 10:
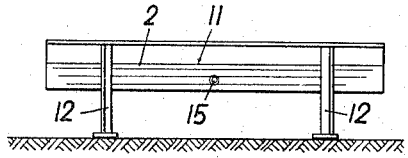
Figure 12:
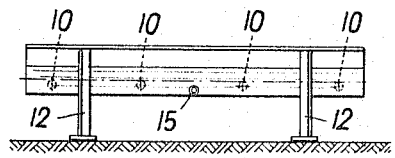

The transport device shown in the FIGS. 11 and 12 in a vertical and side elevation is similar to that in the FIGS. 9 and 10. In this construction supporting rollers 10 are arranged in certain intervals in order to avoid undesired slipping of the belt. This construction is suitable especially for the feeding place of the transport goods to the transport belt as well as for places where the inclination of the transport device is altered.

In the FIGS. 13 and 14 driving and direction-changing rollers 20 are arranged which are known per se. and which have at their ends components 7 for producing an under pressure or partial vacuum within the rollers. Due to this under pressure which communicates with the lower side of the belt through openings 8 the conveyor belt 1 is pneumatically guided in the driving or direction-changing roller 20. The components 7 generally consist of blades or buckets which exhaust or suck the gaseous medium, especially air out from the interior of the guide roller.

In the FIG. 15 the sealing of a conveyor belt 1 according to the invention is represented in a cross section. The edges 26 of the loaded run of a conveyor belt 1 engage with a chamber 21; the walls of said chamber are formed partially by the supporting trough 2 and a covering profile 22. At the open side of the chamber 21 guiding rails 3 are provided which cooperate with the conveyor belt 1 to effect a seal of the chamber 21. The conveyor belt 1 is carried by a gaseous medium which is blown in against the lower or inner face of the upper run of conveyor belt 1 through the supporting trough 2 into the channel-shaped spaces 4. The spaces 4 between the conveyor belt 1 and the supporting trough 2 are defined between guiding rails 3 which have a wavy meander-shaped configuration.

Due to load variations as well as to dynamic influences of the conveyor belt 1 the latter is subjected to lifting and drifting effects which are avoided by the guidance and sealing structure according to the invention. By guiding the conveyor belt 1 especially at its edges 26 within chambers 21 the edges are protected and thus fissures can be avoided substantially. Further it is of advantage that contaminations by the transported goods are avoided so that the guide rails 3 are less worn out in turn.

The covering profiles 22 extend along the entire length of the supporting trough 2 and are removable fixed thereon. The substantially opposite guiding rails 3 on the covering profile 22 and on the supporting trough 2 seal the space 4 between the conveyor belt 1 and the supporting trough 2, the gas in these spaces being at a pressure greater than atmospheric pressure so that the loss of pressure air is extremely restricted. In the chamber 21 stops 23 are provided in order to hinder the conveyor belt 1 from lifting from the guiding rails 3 provided on the bottom of the trough.

In FIG. 16 the edge sealing of a conveyor belt 1, moving on an air cushion, is shown in detail. In this embodiment the stops 23 from FIG. 15 are constructed as actuating levers 24 for the relief valves 25.

These relief valves 25 serve for regulating the excess pressure in the space between the conveyor belt 1 and the supporting trough 2 so that the conveyor belt continuously runs on the guiding rails 3.

The invention is not restricted to the embodiments described in the figures. The conveyor belt for instance can be guided in a tube with for instance circular cross section. In certain cases the conveyor belt can also be guided nearly in a plane, a construction which renders certain advantages in transporting flat goods.

I claim:

1. In a device for transporting goods such as materials in bulk, an endless conveyor belt having a load-carrying run, an elongated trough in which said load-carrying run of said belt is located, and rails supporting the load-carrying run of said belt in a direction extending longitudinally of said trough, said rails, trough, and load-carrying run of said belt defining spaces between said belt and trough limited laterally by said rails, and fluid-supply means for supplying gas at greater than atmospheric pressure into said spaces to support the load-carrying run on gas cushions so as to provide substantially no load on the rails between the trough and the belt, said rails having a wavy, meander-shaped configuration.

2. The combination of claim 1, and wherein said rails are made of plastic material.

3. The combination of claim 1 and wherein said trough is formed with openings through which gas losses are made up during operation.

4. the combination of claim 3 and wherein said fluid-supply means includes distributor channels in the region of said trough openings for distributing the gas under pressure, and vessels containing the gaseous medium and situated in communication with said channels.

5. The combination of claim 1 and wherein direction-changing rollers are situated at the beginning and end of the load-carrying run of said belt, said rollers each being hollow and being provided at opposed ends with components for sucking air out of the hollow interior of said rollers, and said rollers being formed with openings communicating with the belt so that the latter is pneumatically guided on said rollers.

6. The combination of claim 1 and wherein supporting rollers are situated beneath and support the load-carrying run of said belt at the region where material is supplied to said belt and at locations where the inclination of the belt changes.

7. The combination of claim 1 and wherein guide rails engage the outer and inner faces of said belt at said load-carrying run thereof and at the region of each of the side edges thereof for sealing an air cushion on which the belt travels.

8. The combination of claim 7 and wherein the rails which effect said sealing are situated approximately opposite each other in engagement with the opposed inner and outer faces of the belt at each of the edge regions thereof, one of the latter rails being carried by said trough, and a covering profile component carried by said trough and supporting the other of the sealing rails.

9. the combination of claim 8 and wherein said profile and trough form at the region of each edge of the load-carrying run of the belt an elongated chamber which is open at one side and into which the belt edge extends through the open side thereof.

10. The combination of claim 9 and wherein stops are situated in each of said chambers for preventing lifting or drifting of the belt.

11. The combination of claim 10 and wherein said stops have the form of actuating levers for actuating relief valves to reduce the gas pressure beneath the belt.

12. The combination of claim 8 and wherein said covering profile is in the form of an elongated angle member having one of said sealing rails fixed thereto.

13. The combination of claim 12 and wherein said angle member is removably fixed to said trough.

14. In a device for transporting goods such as materials in bulk, an endless conveyor belt having a load-carrying run, an elongated trough in which said load-carrying run of said belt is located, and rails supporting the load-carrying run of said belt in the direction extending longitudinally of said trough, said rails, trough, and load-carrying run of said belt-defining spaces between said belt and trough limited laterally by said rails, and fluid-supply means for supplying gas at greater than atmospheric pressure into said spaces to support the load-carrying run on gas cushions so as to provide substantially no load on the rails between the trough and the belt, guide rails engaging the outer and inner faces of said belt at said load-carrying run thereof and at the region of each of the side edges thereof for sealing an air cushion on which the belt travels, the rails which effect said sealing being situated approximately opposite each other in engagement with the opposed inner and outer faces of the belt at each of the edge regions thereof, one of the latter rails being carried by said trough, and a covering profile component carried by said trough and supporting the other of the sealing rails, said profile and trough forming at the region of each edge of the load-carrying run of the belt an elongated chamber which is open at one side and into which the belt edge extends through the open side thereof, stops being situated in each of said chambers for preventing lifting or drifting of the belt, and said stops having the form of actuating levers for actuating relief valves to reduce the gas pressure beneath the belt.

* * * * *